United States Patent Office 3,062,835
Patented Nov. 6, 1962

3,062,835
METHOD FOR THE PRODUCTION OF 4,4,5-TRI-METHYL-META-DIOXANE
Charles A. Signorino, Bridgeport, Pa., assignor to The Atlantic Refining Company, Philadelphia, Pa., a corporation of Pennsylvania
No Drawing. Filed Mar. 31, 1961, Ser. No. 99,684
4 Claims. (Cl. 260—340.7)

This invention relates to a method for the production of 4,4,5-trimethyl-meta-dioxane. More particularly, it relates to a method for the production of 4,4,5-trimethyl-meta-dioxane by the selective reaction with formaldehyde of 2-methylbutene-2 contained in a hydrocarbon fraction consisting of acyclic 5-carbon atom paraffins and olefins.

The preparation of 4,4,5-trimethyl-meta-dioxane by reacting 2-methylbutene-2 with formaldehyde under the usual conditions for the Prins reaction is well known. However, these conditions are likewise suitable for the condensation of a wide variety of olefins with many different aldehydes. Ordinarily, therefore, if it is desired to produce a particular meta-dioxane it is necessary to use a specific olefin and a specific aldehyde both in pure form. The 4,4,5-trimethyl-meta-dioxane is a particularly desirable meta-dioxane since it can be cracked over an acid catalyst to produce dimethyl butadiene which compound is valuable in the synthesis of various polymeric materials.

It is difficult to obtain 2-methylbutene-2 in pure form in commercial quantities. Commercial quantities of this compound are contained in the 5-carbon atom hydrocarbon fraction produced by the catalytic cracking of petroleum gas oil. This 5-carbon atom hydrocarbon fraction, however, contains various $C_5$ paraffins and $C_5$ olefins such as n-pentane, isopentane, pentene-1, pentene-2, 2-methylbutene-1, in addition to the desired 2-methylbutene-2.

When 2-methylbutene-1 is condensed with formaldehyde there is obtained 4-ethyl,4-methyl-meta-dioxane. This meta-dioxane when cracked yields two different dienes, i.e. 2-ethylbutadiene-1,3 and 3-methylpentadiene-1,3, both of which are undesirable compounds when admixed with the dimethylbutadiene. It also has been found that the 4-ethyl,4-methyl-meta-dioxane produced from condensing 2-methylbutene-1 with formaldehyde cannot be separated from the 4,4,5-trimethyl-meta-dioxane and therefore goes into the cracking step to produce the undesirable dienes which cannot be economically separated from the dimethyl butadiene.

Accordingly, it was found necessary to devise a method for selectively reacting 2-methylbutene-2 with formaldehyde when the 2-methylbutene-2 is contained in a commercially available $C_5$ hydrocarbon fraction.

A method now has been found for selectively reacting the formaldehyde the 2-methylbutene-2 contained in admixture with acyclic 5-carbon atom paraffins and olefins.

It is an object of this invention to provide a method for the production of 4,4,5-trimethyl-meta-dioxane from 2-methylbutene-2 contained in a mixture of acyclic 5-carbon atom paraffins and olefins.

It is another object of this invention to provide a method for the production of 4,4,5-trimethyl-meta-dioxane by the selective reaction with formaldehyde of the 2-methylbutene-2 contained in a mixture of acyclic 5-carbon atom paraffins and olefins.

It is another object of this invention to provide a method for the production of 4,4,5-trimethyl-meta-dioxane by the selective reaction of 2-methylbutene-2 with formaldehyde in the presence of 2-methylbutene-1.

Additional objects of this invention will be apparent from the description and claims that follow.

In accordance with this invention 2-methylbutene-2 contained in a mixture of acyclic 5-carbon atom paraffins and olefins is reacted with formaldehyde under conditions which promote the conversion of the 2-methylbutene-2 into the desired meta-dioxane and inhibit the reaction of the other olefins with the formaldehyde.

It has been found that the conditions which promote the desired selective conversion of the 2-methylbutene-2 are highly specific. Reaction temperatures ranging from 140° F. to 180° F. must be utilized for this selective conversion. If temperatures below 140° F. are employed, the yield of 4,4,5-trimethyl-meta-dioxane drops off exceedingly rapidly. If temperatures above 180° F. are employed, the selectivity disappears since the 2-methylbutene-1 will be converted to its corresponding meta-dioxane, i.e. 4-ethyl,4-methyl-meta-dioxane, at the same rate as the 2-methylbutene-2 is converted into its corresponding meta-dioxane.

The concentration of the sulfuric acid catalyst also has been found to be exceedingly critical. As the acid concentration decreases the selectivity is increased, i.e. the conversion of 2-methylbutene-2 into 4,4,5-trimethyl-meta-dioxane is increased while the conversion of the 2-methylbutene-1 into the 4-ethyl,4-methyl-meta-dioxane is decreased. However, as the acid concentration decreases the yield of meta-dioxane also decreases. Accordingly, it has been found that the sulfuric acid concentration should range between 4 weight percent and 12 weight percent. The reaction time may range between 1 and 60 minutes. Times longer than 60 minutes do not show any appreciable advantage. In general, the reaction is nearly complete within 10 to 30 minutes, however, it is preferred to utilize times of the order of 30 minutes to insure that the reaction has been completed.

Formaldehyde concentrations in the aqueous phase preferably range from 20 percent by weight to 30 percent by weight although this is not a critical feature of the invention as compared with the reaction temperature and acid concentration. Two moles of formaldehyde are required for each mole of olefin in order to produce the desired meta-dioxane. Accordingly, the minimum mole ratio of formaldehyde to olefin is 2:1. However, it is preferable to utilize an excess of formaldehyde and, accordingly, mole ratios of formaldehyde to olefin ranging from 2:1 to 5:1 have been found to be satisfactory, with 3:1 to 5:1 being preferable.

The method of this invention, according to a preferred embodiment, is carried out by diluting sulfuric acid and formalin with water to produce an aqueous solution having the desired concentrations of sulfuric acid and formaldehyde. This aqueous solution is introduced into a pressure vessel and thereafter the olefin-containing hydrocarbon fraction is introduced into the vessel. The quantity of the olefin introduced is measured so that the desired mold ratio of formaldehyde to olefin of from 2:1 to 5:1 is maintained. The vessel containing the aqueous solution and the olefin-containing hydrocarbon fraction is sealed and placed into a constant temperature water bath in which the vessel is agitated in order to insure mixing of the contents and reaction at the reaction temperature of the bath. It is necessary to employ a pressure vessel since the 5-carbon atom hydrocarbon fraction will, of course, develop autogenous pressure at the reaction temperature, of the order of 15 to 40 p.s.i.g. at reaction temperature.

Although the reaction is essentially complete in from 10 to 30 minutes, preferably the vessel is held at the reaction temperature for 30 minutes. The pressure vessell is removed from the heated constant temperature bath and cooled to room temperature and thereafter the contents are allowed to separate into an organic layer and an aqueous layer. The aqueous layer contains the acid and a small amount of organic material and the organic layer contains the meta-dioxane and small quantities of sulfuric acid.

In the experiments to be described herein the organic layer was fractionated to recover the 4,4,5-trimethyl-meta-dioxane and the 4-ethyl,4-methyl-meta-dioxane as a mixture. These compounds, although not separable by distillation, are separable by gas chromatography and were analyzed by this method in order to determine the conversion of the olefin and the proportion of 4,4,5-trimethyl-meta dioxane to 4-ethyl,4-methyl-meta-dioxane.

As stated hereinbefore, an excellent commercial source of 2-methylbutene-2 is found in a 5-carbon atom fraction obtained by the catalytic cracking of gas oil. Gas oil is a fraction obtained from crude petroleum and boils in the range of 600° F. to 1000° F. These hydrocarbons when brought into contact with a cracking catalyst such as a silica-alumina cracking catalyst are cracked into hydrogen and lower molecular weight hydrocarbons ranging from methane through the other normally gaseous hydrocarbons and up to the so-called heating oil boiling range fraction. The cracked products from the cracking reactor are fractionated to separate the normally gaseous hydrocarbons, the butenes, and a fraction comprised predominantly of 5-carbon atom paraffins and olefins. This crude fraction is refractionated to obtain a pure 5-carbon atom fraction free of 6-carbon atom and 7-carbon atom hydrocarbons as well as any 4-carbon atom compounds. It generally consists of n-pentane, iso-pentane, pentene-1, pentene-2, 2-methylbutene-1, and 2-methylbutene-2. The crude fraction boils from about 80° F. to 110° F. and after refractionation the pure 5-carbon atom fraction boils from about 90° F. to 105° F.

The following examples are provided to illustrate specific embodiments and critical features of the invention.

EXAMPLE I

Various synthetic mixtures of 2-methylbutene-2 and 2-methylbutene-1 were prepared. These were charged to the batch pressure reaction vessel and reacted as has been described herein. The reaction conditions and results obtained are set fort in Table I.

the yield of 4,4,5-trimethyl-meta-dioxane is improved by utilizing longer reaction times.

Comparison of runs No. 1 with No. 2 and No. 3 with No. 4 shows that, as the acid concentration is decreased, the yield decreases but the selectivity, i.e. the mole ratio of the 4,4,5-trimethyl-meta-dioxane produced to the 4-ethyl,4-methyl-meta-dioxane produced increases.

The results obtained in runs No. 3 and No. 5 show that the concentration of the formaldehyde has no effect on either conversion or selectivity.

It will be seen by comparing runs No. 5 and No. 6 that if the mole ratio of formaldehyde to 2-methylbutene-2 is increased the yield is increased but the selectivity is relatively unaffected.

Comparison of runs No. 5 and No. 7 show that higher temperatures within the critical range improve yield.

The results obtained from runs No. 7 and No. 8 show that, as the mole ratio of 2-methylbutene-2 to 2-methylbutene-1 in the charge is raised there is an improvement in the purity of the product with high selectivity.

Finally, by comparing the results obtained from runs No. 7 and No. 9 it will be apparent that temperatures outside the critical range drastically decrease both selectivity and yield.

EXAMPLE II

A commercial sample was obtained of a 5-carbon atom hydrocarbon fraction from a commercial catolytic cracking unit operating with a fluidized silica-alumina catalyst and a petroleum gas oil charge. As received this sample had a boiling range of 80° F. to 110° F. This crude fraction was re-fractionated and that fraction having a boiling range of 92° F. to 105° F. was selected as the charge material for conversion to meta-dioxanes. This selected fraction when analyzed was found to have the composition set forth in Table II.

*Table II*

| Component: | Amount weight percent |
|---|---|
| n-Pentane | 8.7 |
| Iso-pentane | 6.1 |
| Pentene-1 | 0.8 |
| Pentene-2 | 28.5 |
| 2-methylbutene-1 | 5.5 |
| 2-methylbutene-2 | 50.4 |

It will be seen from Table II that the mole ratio of 2-methylbutene-2 to 2-methylbutene-1 is approximately 9:1.

Portions of this charge material were reacted under various conditions in the batch pressure reaction vessel and constant temperature bath described hereinbefore.

*Table I*

| Run Number | 1 | 2 | 3 | 4 | 5 | 6 | 7 | 8 | 9 |
|---|---|---|---|---|---|---|---|---|---|
| Mole Ratio: $CH_2O$/2-methylbutene-2 | 3 | 3 | 3 | 3 | 3 | 2.5 | 3 | 3 | 3 |
| Concentration of $CH_2O$ in aqueous solution | 30 | 30 | 30 | 30 | 25 | 26 | 25 | 25 | 30 |
| Concentration of $H_2SO_4$ in aqueous solution | 10 | 5 | 10 | 5 | 10 | 10 | 10 | 10 | 10 |
| Reaction Temperature (° F.) | 140 | 140 | 140 | 140 | 140 | 140 | 170 | 170 | 200 |
| Reaction Time (minutes) | 10 | 10 | 30 | 30 | 30 | 30 | 30 | 30 | 30 |
| Mole Ratio: 2-methylbutene-2/2-methylbutene-1 | 85/15 | 85/15 | 85/15 | 85/15 | 85/15 | 85/15 | 86.5/13.5 | 96/4 | 85/15 |
| Products, Mole Ratio: 4.4.5-trimethyl-m-dioxane/4-ethyl,4-methyl-m-dioxane | 95/5 | 96/4 | 93/7 | 95.5/4.5 | 93/7 | 93.5/6.5 | 95/5 | 98/2 | 90/10 |
| Mole percent yield of 4,4,5-trimethyl-m-dioxane based on 2-methylbutene-2 | 57 | 42 | 75 | 50 | 76 | 68 | 79 | 69 | 62 |

Numerous conclusions may be drawn from the data in Table I, the most important being that 2-methylbutene-2 can be selectively converted to 4,4,5-trimethyl-meta-dioxane in the presence of 2-methylbutene-1 since the mole ratio of 4,4,5-trimethyl-meta-dioxane to 4-ethyl,4-methyl-meta-dioxane is greater than the mole ratio of 2-methylbutene-2 to 2-methylbutene-1.

By comparison of runs No. 1 with No. 3 and No. 2 with No. 4, it will be seen that at this temperature level The mole ratio of formaldehyde to 2-methylbutene-2 was held constant at 3:1 and the concentration of formaldehyde was held constant at 25 weight percent in the aqueous solution for all of the runs. All of the runs were carried out for 30 minutes. The products were fractionated and the dioxane fraction analyzed. It was found that under the mild and selective conditions utilized in accordance with this invention none of the pentene-1 or the pentene-2 reacted. The varied reaction conditions and results obtained are set forth in Table III.

Table III

| Run Number | 10 | 11 | 12 | 13 | 14 | 15 | 16 | 17 | 18 |
|---|---|---|---|---|---|---|---|---|---|
| Concentration of $H_2SO_4$ in aqueous solution | 4 | 8 | 12 | 4 | 8 | 12 | 4 | 8 | 12 |
| Reaction temperature (° F.) | 140 | 140 | 140 | 160 | 160 | 160 | 180 | 180 | 180 |
| Products, percent 4,4,5-trimethyl-m-dioxane in the dioxane fraction | 98.6 | 98.2 | 97.5 | 98.1 | 97.7 | 96.6 | 97.6 | 96.4 | 96.1 |
| Mole percent yield of 4,4,5-trimethyl-m-dioxane based on 2-methylbutene-2 | 49 | 69 | 76 | 71 | 76 | 78 | 75 | 77 | 77 |

A comparison of the effect of acid concentration at a given temperature shows that, as the acid concentration increases, the yield increases, but that the selectivity decreases. Likewise a comparison of the effect of temperature at a constant acid concentration will show that, as the temperature increases, the yield increases but the selectivity decreases. Thus, it appears that the effect of a change of 4 percent in acid concentration is of the same order of magnitude as a change of 20° F. in temperature.

EXAMPLE III

Portions of the same 5-carbon atom hydrocarbon fraction utilized in Example II were also utilized in this example in the batch pressure reaction vessel and constant temperature bath to study the effect of reaction time. In this series of experiments the mole ratio of formaldehyde to 2-methylbutene-2 was held constant at 3:1 and the concentration of formaldehyde was held constant at 25 weight percent in the aqueous solution for all of the runs. The acid concentration likewise was held constant at 8 percent and a reaction temperature of 160° F. was utilized for all of the runs. In Table IV the results are set forth for the various times.

Table IV

| Run Number | 19 | 20 | 21A | 21B | 22 | 23 | 24 |
|---|---|---|---|---|---|---|---|
| Reaction time (minutes) | 10 | 20 | 30 | 30 | 60 | 120 | 240 |
| Products, Percent 4,4,5-trimethyl-m-dioxane in the dioxane fraction | 97.6 | 97.6 | 97.2 | 97.4 | 96.9 | 96.9 | 96.8 |
| Mole percent yield of 4,4,5-trimethyl-m-dioxane based on 2-methylbutene-2 | 62 | 75 | 78 | 83 | 90 | 88 | 80 |

It will be seen from these experiments that reaction time has little effect on the selectivity, the selectivity decreasing slightly as the reaction time increases. The yield, however, increases up to a reaction time of one hour beyond which there is essentially no change, indicating that the reaction is essentially complete in one hour.

EXAMPLE IV

Portions of the same charge material utilized in Examples II and III were also studied under conditions to demonstrate the effect of mole ratio of formaldehyde to 2-methylbutene-2 at two different acid concentration levels. The formaldehyde concentration was held constant at 25 weight percent in the aqueous phase. A reaction temperature of 140° F. was used in each of the runs and each of the runs was for 30 minutes' reaction time. The results of these experiments are set forth in Table V.

Table V

| Run Number | 25 | 26 | 27 | 28 | 29 | 30 |
|---|---|---|---|---|---|---|
| Mole Ratio: $CH_2O$/2-methylbutene 2 | 2 | 3 | 5 | 2 | 3 | 5 |
| Concentration of $H_2SO_4$ in aqueous solution | 4 | 4 | 4 | 12 | 12 | 12 |
| Products, Percent 4,4,5-trimethyl-m-dioxane in the dioxane fraction | 99 | 98.6 | 99 | 97.7 | 97.5 | 95.4 |
| Mole percent yield of 4,4,5-trimethyl-m-dioxane based on 2-methylbutene-2 | 38 | 49 | 50 | 66 | 76 | 81 |

These data show that at a constant acid concentration an increase in mole ratio has either no effect or only a minor effect on the selectivity, but increases the yield rather markedly. The data also show as was found from the studies in Example II that, as the acid concentration is increased, the selectivity decreases but the yield increases at a constant ratio of formaldehyde to 2-methylbutene-2.

EXAMPLE V

The crude 5-carbon hydrocarbon fraction as received and prior to re-distillation to produce the charge stock for Examples II, III, and IV was utilized as a charge material in order to determine whether it was necessary to purify the crude 5-carbon atom hydrocarbon fraction. The mole ratio of 2-methylbutene-2 to 2-methylbutene-1 in this crude fraction was 3:1. The same apparatus and experimental procedure was followed in this example as in the previous examples. The mole ratio of formaldehyde to 2-methylbutene-2 was held constant at 3:1, the concentration of formaldehyde was held constant at 25 weight percent, and a reaction temperature of 160° F. for 30 minutes was utilized in each of the runs. The only reaction variable which was varied was the acid concentration. The results of these experiments are set forth in Table VI.

Table VI

| Run Number | 31 | 32 | 33 |
|---|---|---|---|
| Concentration of $H_2SO_4$ in aqueous solution | 4 | 8 | 12 |
| Products, Percent 4,4,5-trimethyl-m-dioxane in the dioxane fraction | 94.5 | 92.0 | 90.8 |
| Mole percent yield of 4,4,5-trimethyl-m-dioxane based on 2-methylbutene-2 | 52 | 70 | 76 |

These data show that a high selectivity can be realized within the critical reaction conditions of this invention and that, by increasing the acid concentration, high yields are obtained. It was found from other experiments that if the acid concentration was increased beyond the 12 percent upper limit, the other olefins in the reaction mixture were converted to meta-dioxanes with the result the selectivity was lost.

I claim:

1. A method for the production of 4,4,5-trimethyl-meta-dioxane which comprises selectively reacting 2-methylbutene-2 with formaldehyde in the presence of 2-methylbutene-1, at reaction temperatures ranging from 140° F. to 180° F. in the presence of aqueous sulfuric acid having a concentration ranging from 4 weight percent to 12 weight percent, the mole rtio of the formaldehyde to the 2-methylbutene-2 ranging between 2:1 and 5:1.

2. A method for the production of 4,4,5-trimethyl-meta-dioxane which comprises selectively reacting 2-methylbutene-2 with formaldehyde in the presence of 2-methylbutene-1, said 2-methylbutene-2 and 2-methylbutene-1 being contained in a hydrocarbon fraction consisting essentially of acyclic 5-carbon atom paraffins and olefins, at reaction temperatures ranging from 140° F. to 180° F. in the presence of aqueous sulfuric acid having a concentration ranging from 4 weight percent to 12 weight percent, the mole ratio of the formaldehyde to the 2-methylbutene-2 ranging between 3:1 and 5:1.

3. A method for the production of 4,4,5-trimethylmeta-dioxane which comprises selectively reacting 2-methylbutene-2 contained in a hydrocarbon fraction consisting essentially of acyclic 5-carbon atom paraffins and olefins with formaldehyde at reaction temperatures ranging from 140° F. to 180° F. in the presence of aqueous sulfuric acid having a concentration ranging from 4 weight percent to 12 weight percent, the mole ratio of the formaldehyde to the 2-methylbutene-2 ranging between 2:1 and 5:1.

4. A method for the production of 4,4,5-trimethyl-meta-dioxane which comprises selectively reacting 2-methylbutene-2 contained in a hydrocarbon fraction consisting essentially of acyclic 5-carbon atom paraffins and olefins with formaldehyde at reaction temperatures ranging from 140° F. to 180° F. in the presence of aqueous sulfuric acid having a concentration ranging from 4 weight percent to 12 weight percent, the mole ratio of the formaldehyde to the 2-methylbutene-2 ranging between 3:1 and 5:1.

References Cited in the file of this patent
UNITED STATES PATENTS

| | | |
|---|---|---|
| 2,362,307 | Ritter | Nov. 7, 1944 |
| 2,962,507 | Hellin et al. | Nov. 29, 1960 |
| 3,000,905 | Wheeler et al. | Sept. 19, 1961 |

UNITED STATES PATENT OFFICE
CERTIFICATE OF CORRECTION

Patent No. 3,062,835                          November 6, 1962

Charles A. Signorino

It is hereby certified that error appears in the above numbered patent requiring correction and that the said Letters Patent should read as corrected below.

Column 1, line 54, for "the", first occurrence, read -- with --; column 2, lines 16 and 17, after "exceedingly" strike out the comma; column 4, line 28, for "catolytic" read -- catalytic --; column 6, line 60, for "rtio" read -- ratio --.

Signed and sealed this 2nd day of April 1963.

(SEAL)
Attest:

ESTON G. JOHNSON

Attesting Officer

DAVID L. LADD

Commissioner of Patents